(12) United States Patent
Lichti

(10) Patent No.: US 12,524,005 B2
(45) Date of Patent: Jan. 13, 2026

(54) SYSTEM AND METHOD FOR REMOTE ROBOTIC OVERSIGHT

(71) Applicant: 11712381 Canada Corporation, Waterloo (CA)

(72) Inventor: Tim Lichti, Waterloo (CA)

(73) Assignee: 11712381 Canada Corporation

( * ) Notice: Subject to any disclaimer, the term of this patent is extended or adjusted under 35 U.S.C. 154(b) by 177 days.

(21) Appl. No.: 17/982,374

(22) Filed: Nov. 7, 2022

(65) Prior Publication Data

US 2023/0144646 A1     May 11, 2023

Related U.S. Application Data

(60) Provisional application No. 63/276,875, filed on Nov. 8, 2021.

(51) Int. Cl.
    *G05D 1/00*                (2024.01)

(52) U.S. Cl.
    CPC ......... *G05D 1/0038* (2013.01); *G05D 1/0027* (2013.01); *G05D 1/0077* (2013.01)

(58) Field of Classification Search
    CPC ... G05D 1/0038; G05D 1/0027; G05D 1/0077
    See application file for complete search history.

(56) References Cited

U.S. PATENT DOCUMENTS

| | | | | |
|---|---|---|---|---|
| 10,564,638 | B1 * | 2/2020 | Lockwood | G05D 1/0027 |
| 10,583,803 | B2 * | 3/2020 | Ferguson | G06Q 10/083 |
| 11,249,473 | B2 * | 2/2022 | Shintani | G01C 21/3407 |
| 2015/0248131 | A1 * | 9/2015 | Fairfield | G05D 1/0033 701/2 |
| 2019/0265710 | A1 * | 8/2019 | Kaneko | B60W 50/082 |
| 2019/0339692 | A1 * | 11/2019 | Sakai | G05D 1/0027 |
| 2020/0062267 | A1 * | 2/2020 | Magzimof | B60W 50/082 |
| 2022/0089181 | A1 * | 3/2022 | Gross | G07C 5/0841 |
| 2023/0138112 | A1 * | 5/2023 | Gross | G08G 1/04 701/24 |

FOREIGN PATENT DOCUMENTS

| | | | |
|---|---|---|---|
| JP | 2017054206 A | * | 3/2017 |
| WO | WO-2021019787 A1 | * | 2/2021 |

* cited by examiner

*Primary Examiner* — Dino Kujundzic

(57) ABSTRACT

Computing platforms, methods, and storage media are disclosed for managing remote oversight of a plurality of robots. A controller may be in communication with a plurality of robots. The controller may be configured to: obtain a dynamic risk score for each of the plurality of robots, the dynamic risk score associated with operational risk of proper robot operation; assign, based on the dynamic risk score for each of the plurality of robots, a set of robots to an operator for remote oversight; and provide, to a display associated with the operator, a set of visual representations associated with the set of robots assigned to the operator for remote oversight. The controller may dynamically determine and assign the dynamic risk score based on one or more risk factors. The controller may dynamically generate a visual interface for managing remote oversight of the plurality of robots.

12 Claims, 7 Drawing Sheets

SYSTEM AND METHOD FOR REMOTE ROBOTIC OVERSIGHT

CROSS-REFERENCE

This application claims the benefit of priority of U.S. patent application Ser. No. 63/276,875, filed Nov. 8, 2021, which is hereby incorporated by reference.

FIELD

The present disclosure relates to robotics, including but not limited to a system, computing platform, method, and storage media for remote robotic oversight, for example using remote robotic guardians.

BACKGROUND

Robotics systems and robots are used in a number of different implementations. In many cases, a robot may encounter an adverse condition while performing robotic functions for which it has been designed. Examples of such an adverse condition include coming into contact with an object or a surface that restricts or prevents robot movement along a desired path.

For a robot operating in an autonomous mode, it can be desirable to have the ability to provide remote oversight and/or control of the robot, for example to determine whether the robot encounters an adverse condition. While a robot may employ one or more sensors to assist in identifying whether the robot has encountered an adverse condition, it can be desirable to provide a remote guardian with access to a camera view of the environment around the robot.

However, complexity is increasing both in terms of the robots themselves as well as their implementations. This may introduce complications with respect to providing suitable oversight to robots that operate in an autonomous mode.

Improvements in approaches for remote robotics oversight are desirable.

BRIEF DESCRIPTION OF THE DRAWINGS

Embodiments of the present disclosure will now be described, by way of example only, with reference to the attached Figures.

DETAILED DESCRIPTION

Figure 1:
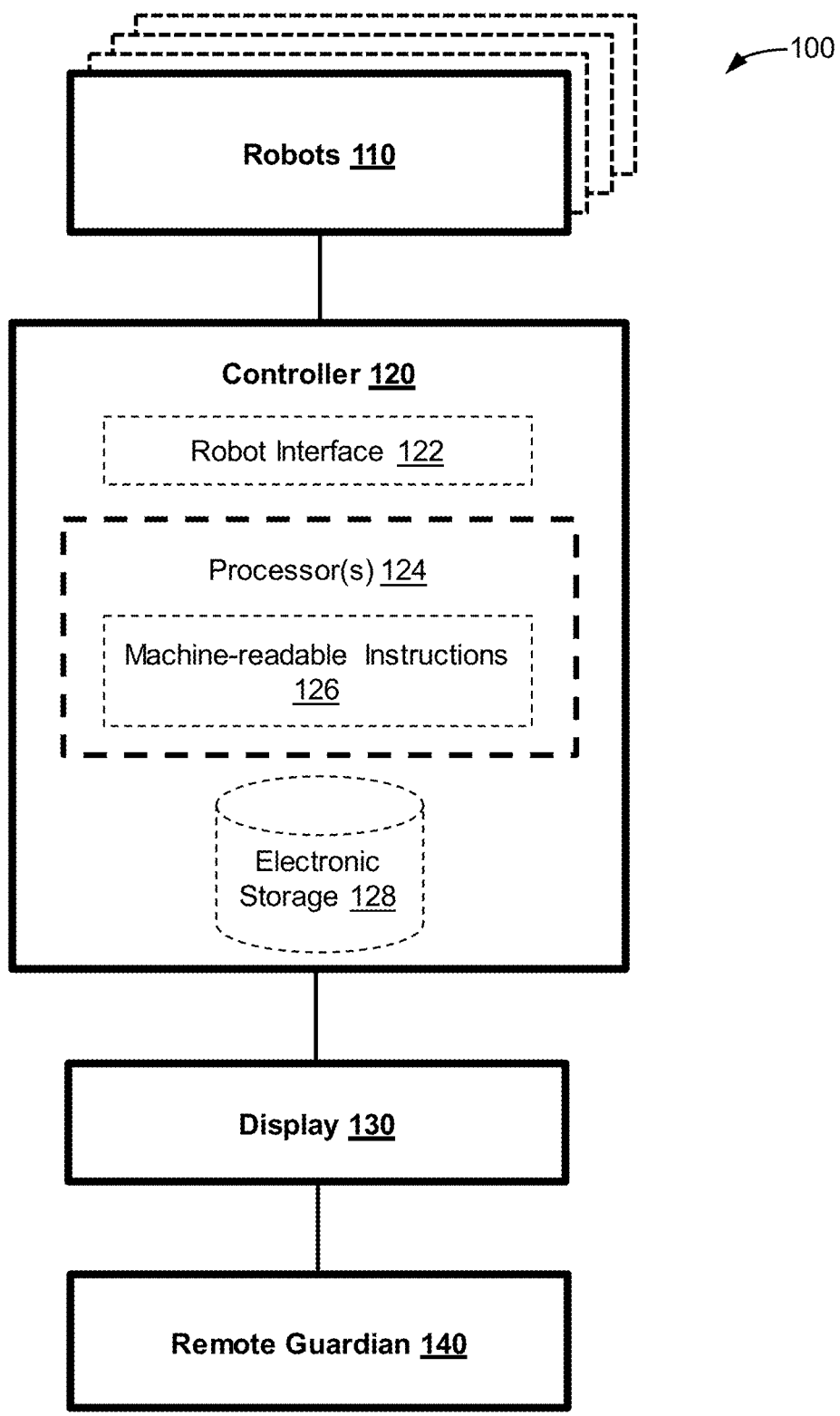
FIG. 1 illustrates a system for managing remote oversight of a plurality of robots, in accordance with one or more embodiments.

Computing platforms, methods, and storage media are disclosed for managing remote oversight of a plurality of robots. A controller may be in communication with a plurality of robots. The controller may be configured to: obtain a dynamic risk score for each of the plurality of robots, the dynamic risk score associated with operational risk of proper robot operation; assign, based on the dynamic risk score for each of the plurality of robots, a set of robots to an operator for remote oversight; and provide, to a display associated with the operator, a set of visual representations associated with the set of robots assigned to the operator for remote oversight. The controller may dynamically determine and assign the dynamic risk score based on one or more risk factors. The controller may dynamically generate a visual interface for managing remote oversight of the plurality of robots.

In an example embodiment, the present disclosure provides a semi-autonomous solution that enables autonomous robot operation most of the time, and enables tele-operation by a "Remote Guardian" the rest of the time. For example, for large sidewalk robots, autonomous operation may be enabled about 80-95% of the time, with the other about 5-20% of operation performed via tele-operation by a remote guardian. The approximately 5-20% of operation of movement may be performed based on a risk-based approach that may incorporate historical understanding of real-life risk factors of operation.

Embodiments of the present disclosure provide, calculate or utilize a scoring system that dynamically evaluates risk of a number of factors, including some risk factors unique to autonomous robotics, for example autonomous snow plowing and autonomous grass cutting. Embodiments of the present disclosure determine and utilize a dynamically changing, overall risk-based score to determine what level of risk is involved in having a vehicle operate in autonomous mode at that time. The determined risk-based score may in-turn dictate how many robots one remote guardian is permitted to safely oversee. For example, whether 1 remote guardian oversees 1 robot, 2 robots or x robots may change based on the overall risk score, which may change throughout the day or based on the area being serviced.

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

Certain terms used in this application and their meaning as used in this context are set forth in the description below. To the extent a term used herein is not defined, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

FIG. 1 illustrates a system 100 for managing remote oversight of a plurality of robots 110, in accordance with one or more embodiments. A robot 110 may be any simple or complex robotics system configured for either indoor or outdoor use. For example, the robot may include a singleuse or multi-use robot for snow clearing and/or grass cutting. In an example implementation, the robot is configured to operate in an autonomous mode, which may be a normal operational mode. The robot may also be configured to operate in a tele-operator mode and/or in a mode in which a remote guardian 140 may observe robot operation and/or intervene with robot operation.

A remote guardian 140 may be a person who is located remote from the robot, for example located physically anywhere in the world, and assigned to oversee or keep an eye on one or more robots at a time. The remote guardian may be responsible for making sure that the robot(s) is/are operating safely, and may intervene whenever there is a need to intervene. For example, if a pedestrian is getting close to the robot, the remote guardian 140 may provide a notification, for example using two way audio, to advise the pedestrian that operation of the robot has been paused, and that they are free to proceed.

The system 100 comprises a controller 120. The controller 120 is in communication with the plurality of robots 110 and may be configured to obtain a dynamic risk score for each of the plurality of robots. The dynamic risk score may be associated with operational risk of proper robot operation. In an example embodiment, the controller 120 may be configured to obtain the dynamic risk score for each of the plurality of robots based on real-time operational risk of proper robot operation.

The controller 120 may be configured to assign, based on the dynamic risk score for each of the plurality of robots, a set of robots to an operator for remote oversight. In an embodiment, the operator may be a remote guardian 140. The set of robots assigned to the operator for remote oversight may be a subset of the plurality of robots. The controller 120 may be configured to provide, to a display 130 associated with the operator, a set of visual representations associated with the set of robots assigned to the operator for remote oversight. The controller 120 may be configured to cause one or more robots in the set of robots to switch between autonomous mode and tele-operation mode.

In an example embodiment, providing the set of visual representations associated with the set of robots may comprise providing a set of video feeds. The set of video feeds may comprise a separate video feed associated with each robot in the set of robots. The number of video feeds may be based on the dynamic risk score for each of the plurality of robots. In an example embodiment, providing the set of visual representations associated with the set of robots may comprise providing a set of video streams. The set of video streams may comprise a separate video stream associated with each robot in the set of robots.

The controller 120 enables the system 100 to provide a remote guardian 140 with the ability to watch a certain number of screens for safety considerations, with the number of screens watched based on risk factors. The controller 120 may assign a remote guardian 140 to a 1:1 oversight relationship with a robot 110 based on the dynamic risk score for that robot. The controller may assign a remote guardian 140 to a 1:4 oversight relationship such that the remote guardian 140 is concurrently provided with a video feed for each of the 4 robots the remote guardian is assigned to oversee.

If the remote guardian sees something that is important or of concern in a video feed, the remote guardian may remotely pause operation of the robot associated with that video feed, in order to be able to investigate further. In such a scenario, the controller 120 may dynamically, and optionally temporarily, re-assign the other 3 robots to a second remote guardian while the first remote guardian investigates the issue observed in the video feed of the fourth robot they were overseeing. Conversely, the remote guardian may "assign", via the controller 120, the video feed that is important or of concern to a different remote guardian. In an implementation, the assignment of the specific remote guardian may be done by, or to, someone with special training in an area; for example a specialized trainer may have special training in how to explain to a person damaging a robot that such damage is an unwise choice, and that further damage may result in charges.

Consider an example embodiment in which a robot is configured for autonomous snow clearing. If the robot is configured for snow plowing down a sidewalk, the robot may be configured to detect when it is within a designated distance, for example 2 meters, of a street crossing. In response to detecting a street crossing, the dynamic risk score may increase, and cause the robot operation to be paused, or cause the robot to be put in a 1:1 oversight relationship with a remote guardian. The system 100 may be configured to switch the robot 110 from autonomous mode to tele-operator mode. The remote guardian 140 may remotely operate the robot 110 to cross the street, and then provide an indication for the system to switch the robot back to autonomous mode.

In an example embodiment, the controller 120 may comprise one or more processors 122, and electronic storage 126, such as a non-transient computer-readable storage medium having machine-readable instructions 124 embodied thereon. The one or more processors 122 may be configured to execute the instructions 124 to: obtain a dynamic risk score for each of the plurality of robots, the dynamic risk score associated with operational risk of proper robot operation; assign, based on the dynamic risk score for each of the plurality of robots, a set of robots to an operator for remote oversight; and provide, to a display associated with the operator, a set of visual representations associated with the set of robots assigned to the operator for remote oversight.

In an example embodiment, the system 100, for example at the controller 120, may actively determine the dynamic risk score. In an example embodiment, the controller 120 is configured to determine, for example at a processor associated with the controller 120, the dynamic risk score for each of the plurality of robots based on one or more risk factors. The controller 120 may store or cause storage of, in a memory associated with the processor, the determined dynamic risk score for each of the plurality of robots.

In an example embodiment, the dynamic risk score may be based on a risk factor, and assigning the set of robots to the operator may be based on the risk factor. In an example embodiment, the risk factor may comprise a robot risk factor selected from the group consisting of: proximity of people per hour of operation; proximity to roads; time of day; speed of movement; detected obstacles; detected unknown objects; detected high risk objects; visibility rating; lighting conditions; and latency of connection between robot and operator.

In another example embodiment, the risk factor may comprise an operator risk factor selected from the group consisting of: quality of video feed received by operator; measured reaction time of operator; alertness indicator; length of time on current shift; speed test results; and fake situation identification results.

Examples of various risk factors include the number of people near to the robot per hour of operation, time-of-day, proximity to roads, speed of movement, etc. Examples of risk factors more specific to larger, heavier sidewalk robots include overhanging bumpers of vehicles on sidewalks, obstacles in the way such as garbage bins, physical items that may indicate risk when plowing but may be innocent. One such example is a mitten in the snow, which may be an indicator of whether there is a child hiding in the snow, or it may be a discarded mitten.

In an example embodiment, the system may assign points for various risk factors in a given time period, for example each minute. A number of different thresholds may be defined. For example, if the overall risk "points" is 25 or below, a remote guardian may oversee 4 robots. If the overall risk "points" is 26-50 points, the remote guardian may oversee 3 robots. If overall risk "points" is 51-75, the remote guardian may oversee 2 robots. If overall risk "points" is 76 or more, the remote guardian may only oversee 1 robot.

According to example embodiments, a number of factors may contribute to risk points that may contribute to the dynamic risk score. For example, for the category of the amount of pedestrian traffic present: 0 points may be given if 0 people are within 20 feet of the robot within the last 60 minutes; 1 point may be given if 1-2 people are within 20 feet of the robot within the last 60 minutes; 3 points may be given if 3-5 people are within 20 feet of the robot within the last 60 minutes; 5 points may be given if 6-10 people are within 20 feet of the robot within the last 60 minutes; and 10 points may be given if 10+ people are within 20 feet of the robot within the last 60 minutes.

While pedestrians in an area may be common to all sidewalk robots as a risk factor, there may be certain factors that are more important to specific implementations, such as autonomous snow plows on sidewalks. For example, a 20-pound "delivery robot" is not especially concerned about a playing child shrouded by snow. However, a snow clearing robot may weigh over 1,500 pounds and autonomously plow several hundreds of pounds at a time; in such a context, a hidden child playing in the snow may be an extremely concerning event.

The identification or weighting of specific risk factors may be based on implementation-specific parameters, for example risk factors associated with robots plowing snow, salting & cutting grass on autonomous paths. Providing a 1:1 oversight relationship may enable a remote guardian to observe and catalog risk factors for the single overseen robot. A computing system may also review the video feed for the robot and be configured to automatically identify and catalog risk factors, for example by correlating with indications of non-operation or pausing of the robot, or based on machine-learning processes, for example based on object recognition. An in-person chaperone may alternatively provide insight into risk factors, how often they are encountered, etc. An example of a grass cutting-specific risk factor is the number of pieces of rocks larger than ¼ inch in the path of the grass cutting deck per hour. Another example is the number of pieces of garbage in the path of the grass cutting deck per hour. Yet more examples of risk factors include the degree of slope, wetness of the ground, time of day (not safe during "golden hour", etc.).

Additional risk factors include one or more of: latency of internet connection to the remote guardian (e.g. 50 milliseconds vs 500 milliseconds); quality of video feed to the remote guardian (e.g. high resolution & 25 FPS or Frames Per Second vs low resolution and 5 FPS); measured reaction times of the remote guardian, sometimes using tests throughout the day to determine alertness & mental state; the number of hours into a shift the remote guardian has worked (e.g. less likely to oversee 4 robots at once 12 hours into a shift versus 2 hours into a shift); visibility rating, e.g. during operation in freezing rain versus no precipitation, or in snow squalls versus gently falling snow or no snow; physical area of town/neighbourhood (e.g. a neighbourhood downtown with a history of robot vandalism versus a sparsely populated suburb with little or no history of robot vandalism); quality of light in the area (e.g. during the day with solid lighting for long distances versus at 4 am where only the robot's night lights are illuminating its immediate surroundings); time-of-day (e.g. assumed a school area has few kids out at 3 am versus at 8 am, where the risk of kids running up the robot is much higher).

Further risk factors include one or more of: speed of operation of the robot (e.g. 10 km/hour versus 2 km/hour); type of path a robot is on (e.g. a sidewalk with 6 feet of grass between the sidewalk and the street versus a curb-facing sidewalk where the sidewalk meets the street immediately vs a biking trail or biking lane which regularly is nearby people biking versus the shoulder of a street where cars are regularly close by vs the middle of a residential street itself where robots may sometimes be expected to pull over the shoulder of the road to let faster cars pass; the width of the path a robot is on—for example, a 4-foot sidewalk (older sidewalks are this width) has much less margin for error than 5-foot or 5.5-foot sidewalks, which is the width of most new sidewalks; other "points of interest" on a robot's path that may justify a lower ratio of robots to remote guardians, for example a block of sidewalks that has several retaining walls versus a block of sidewalks without any retaining walls; blocks of sidewalks that currently have, or historically have had, a higher proportion of cars & trucks that "overhang" onto the sidewalk (especially in residential areas without deep driveways).

Remote guardians may be trained on certain "groups" of properties with routing of video feeds based on their training. For example, remote guardians may typically have a number of properties (e.g. 2 or 3 shopping plazas for snow removal or 20 properties throughout the week for grass cutting) that they regularly oversee. There will naturally be some overlap between remote guardians and properties. In an example embodiment, the controller may execute the process of choosing which robot video feeds go to which remote guardians by skewing towards remote guardians being given properties that they regularly oversee whenever possible. For example, it may be much easier for a remote guardian to oversee a site that they know very well, since there are still regular transitions from autonomous mode to tele-operated parts of the property to be performed.

Figure 2:
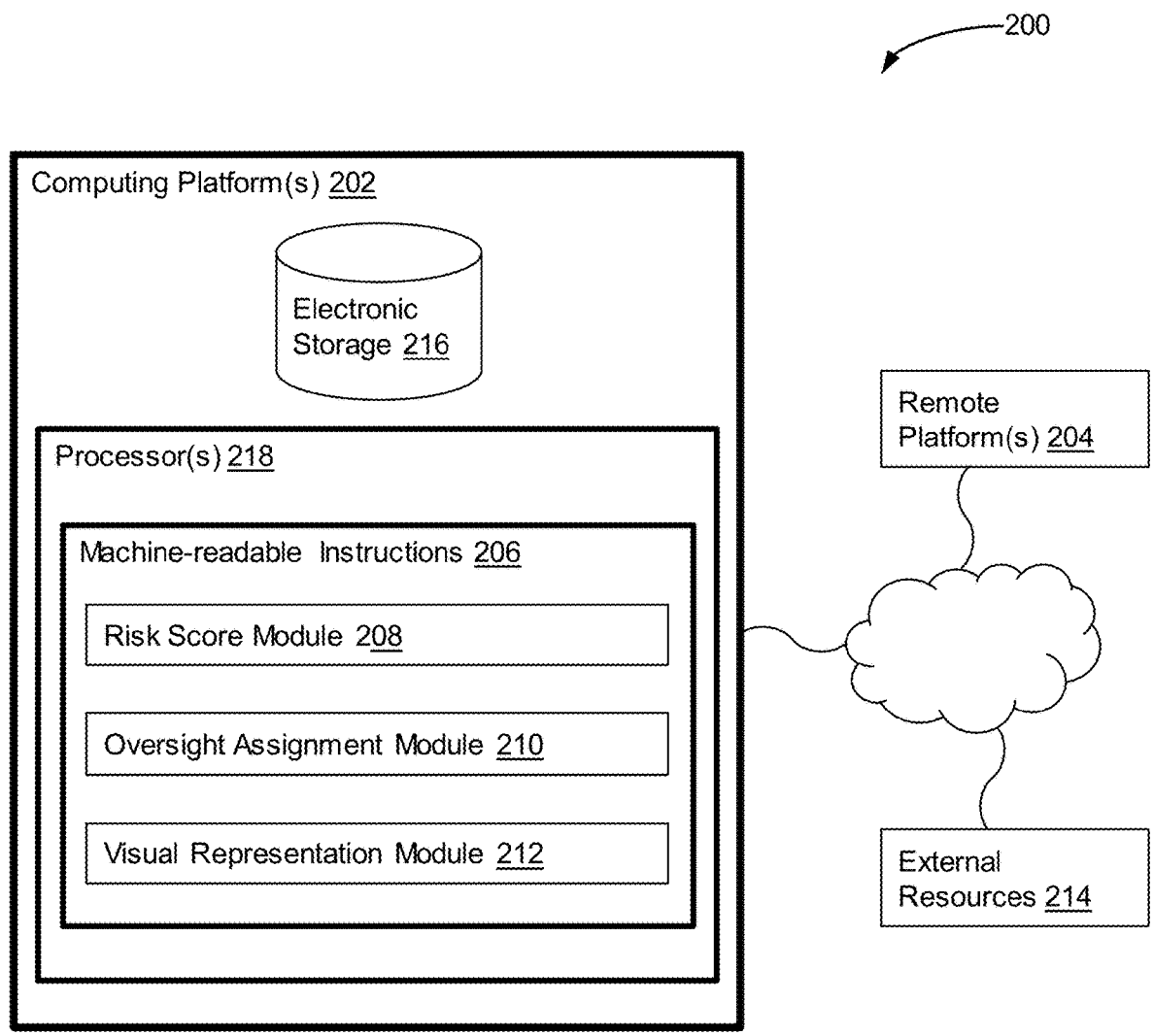
FIG. 2 illustrates another system for managing remote oversight of a plurality of robots, in accordance with one or more embodiments.

FIG. 2 illustrates a robot control and sensor system 200, in accordance with one or more embodiments. In some embodiments, system 200 may include one or more computing platforms 202. Computing platform(s) 202 may be configured to communicate with one or more remote platforms 204 according to a client/server architecture, a peer-to-peer architecture, and/or other architectures. Remote platform(s) 204 may be configured to communicate with other remote platforms via computing platform(s) 202 and/or according to a client/server architecture, a peer-to-peer architecture, and/or other architectures. Users may access system 200 via remote platform(s) 204.

Computing platform(s) 202 may be configured by machine-readable instructions 206. Machine-readable instructions 206 may include one or more instruction modules. The instruction modules may include computer program modules. The instruction modules may include one or more of risk score module 208, oversight assignment module 210, visual representation module 212, and/or other instruction modules.

Risk score module 208 may be configured to obtain a dynamic risk score for each of the plurality of robots. The dynamic risk score may be associated with operational risk of proper robot operation. Risk score module 208 may be configured to determine, for example at a processor, the dynamic risk score for each of the plurality of robots based on one or more risk factors. Risk score module 208 may be configured to store, in a memory associated with the processor, the determined dynamic risk score for each of the plurality of robots.

Oversight assignment module 210 may be configured to assign, based on the dynamic risk score for each of the plurality of robots, a set of robots to an operator for remote oversight. The operator may be a remote guardian.

Visual representation module 212 may be configured to provide, to a display associated with the operator, a set of visual representations associated with the set of robots assigned to the operator for remote oversight.

In some embodiments, computing platform(s) 202, remote platform(s) 204, and/or external resources 214 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 202, remote platform(s) 204, and/or external resources 214 may be operatively linked via some other communication media.

A given remote platform 204 may include one or more processors configured to execute computer program modules. The computer program modules may be configured to enable an expert or user associated with the given remote platform 204 to interface with system 200 and/or external resources 214, and/or provide other functionality attributed herein to remote platform(s) 204. By way of non-limiting example, a given remote platform 204 and/or a given computing platform 202 may include one or more of a server, a desktop computer, a laptop computer, a handheld computer, a tablet computing platform, a NetBook, a Smartphone, a gaming console, and/or other computing platforms.

In an example embodiment, computing platform(s) 202 according to the present disclosure may provide a device interface, or computer interface. External resources 214 may include sources of information outside of system 200, external entities participating with system 200, and/or other resources. In some embodiments, some or all of the functionality attributed herein to external resources 214 may be provided by resources included in system 200.

Computing platform(s) 202 may include electronic storage 216, one or more processors 218, and/or other components. Computing platform(s) 202 may include communication lines, or ports to enable the exchange of information with a network and/or other computing platforms. Illustration of computing platform(s) 202 in FIG. 2 is not intended to be limiting. Computing platform(s) 202 may include a plurality of hardware, software, and/or firmware components operating together to provide the functionality attributed herein to computing platform(s) 202. For example, computing platform(s) 202 may be implemented by a cloud of computing platforms operating together as computing platform(s) 202.

Electronic storage 216 may comprise non-transitory storage media that electronically stores information. The electronic storage media of electronic storage 216 may include one or both of system storage that is provided integrally (i.e., substantially non-removable) with computing platform(s) 202 and/or removable storage that is removably connectable to computing platform(s) 202 via, for example, a port (e.g., a USB port, a firewire port, etc.) or a drive (e.g., a disk drive, etc.). Electronic storage 216 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 216 may include one or more virtual storage resources (e.g., cloud storage, a virtual private network, and/or other virtual storage resources). Electronic storage 216 may store software algorithms, information determined by processor(s) 218, information received from computing platform(s) 202, information received from remote platform(s) 204, and/or other information that enables computing platform(s) 202 to function as described herein.

Processor(s) 218 may be configured to provide information processing capabilities in computing platform(s) 202. As such, processor(s) 218 may include one or more of a digital processor, an analog processor, a digital circuit designed to process information, an analog circuit designed to process information, a state machine, and/or other mechanisms for electronically processing information. Although processor(s) 218 is shown in FIG. 2 as a single entity, this is for illustrative purposes only. In some embodiments, processor(s) 218 may include a plurality of processing units. These processing units may be physically located within the same device, or processor(s) 218 may represent processing functionality of a plurality of devices operating in coordination. Processor(s) 218 may be configured to execute modules 208, 210, and/or 212, and/or other modules. Processor(s) 218 may be configured to execute modules 208, 210, and/or 212, and/or other modules by software; hardware; firmware; some combination of software, hardware, and/or firmware; and/or other mechanisms for configuring processing capabilities on processor(s) 218. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 208, 210, and/or 212, are illustrated in FIG. 2 as being implemented within a single processing unit, in embodiments in which processor(s) 218 includes multiple processing units, one or more of modules 208, 210, and/or 212 may be implemented remotely from the other modules. The description of the functionality provided by the different modules 208, 210 and/or 212 described below is for illustrative purposes, and is not intended to be limiting, as any of modules 208, 210 and/or 212 may provide more or less functionality than is described. For example, one or more of modules 208, 210 and/or 212 may be eliminated, and some or all of its functionality may be provided by other ones of modules 208, 210 and/or 212. As another example, processor(s) 218 may be configured to execute one or more additional modules that may perform some or all of the functionality attributed below to one of modules 208, 210 and/or 212.

Figure 3:
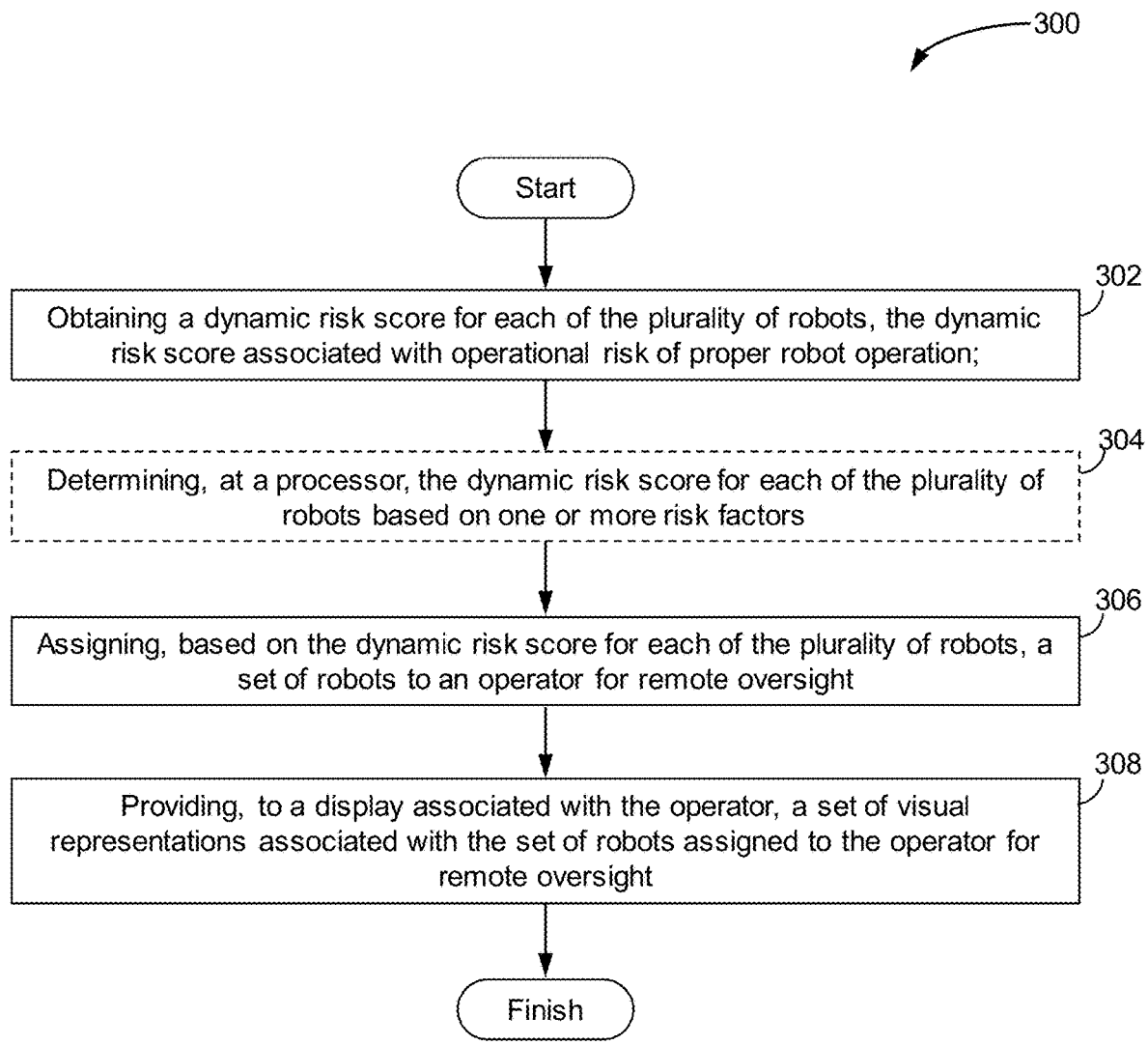
FIG. 3 illustrates a method for managing remote oversight of a plurality of robots, in accordance with one or more embodiments.

FIG. 3 illustrates a method 300 for managing remote oversight of a plurality of robots, in accordance with one or more embodiments. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include obtaining a dynamic risk score for each of the plurality of robots, the dynamic risk score associated with operational risk of proper robot operation. Operation 302 may be performed by one or more hardware processors configured by machine-readable instructions including a module that is the same as or similar to risk score module 208, in accordance with one or more embodiments.

An optional operation 304 may include determining, at a processor, the dynamic risk score for each of the plurality of robots based on one or more risk factors. Operation 304 may be performed by one or more hardware processors configured by machine-readable instructions including a module that is the same as or similar to risk score module 210, in accordance with one or more embodiments.

An operation 306 may include assigning, based on the dynamic risk score for each of the plurality of robots, a set of robots to an operator for remote oversight. Operation 306 may be performed by one or more hardware processors configured by machine-readable instructions including a module that is the same as or similar to oversight assignment module 210, in accordance with one or more embodiments.

An operation 308 may include providing, to a display associated with the operator, a set of visual representations associated with the set of robots assigned to the operator for remote oversight. Operation 308 may be performed by one or more hardware processors configured by machine-readable instructions including a module that is the same as or similar to visual representation module 212, in accordance with one or more embodiments.

Figure 4A:
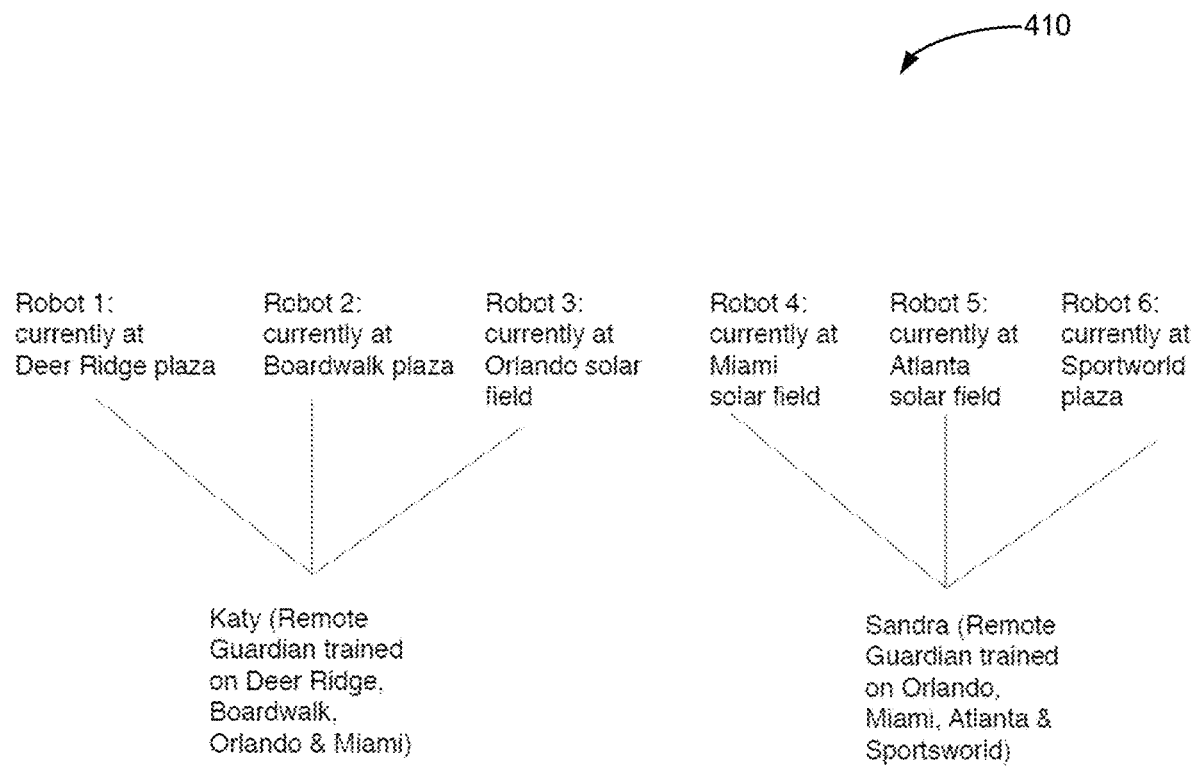
FIG. 4A, FIG. 4B and FIG. 4C illustrate dynamic assignments for remote robotic oversight based on dynamic risk scores for a low risk scenario, medium risk scenario, and high risk scenario, respectively, in accordance with one or more embodiments.
Figure 4B:
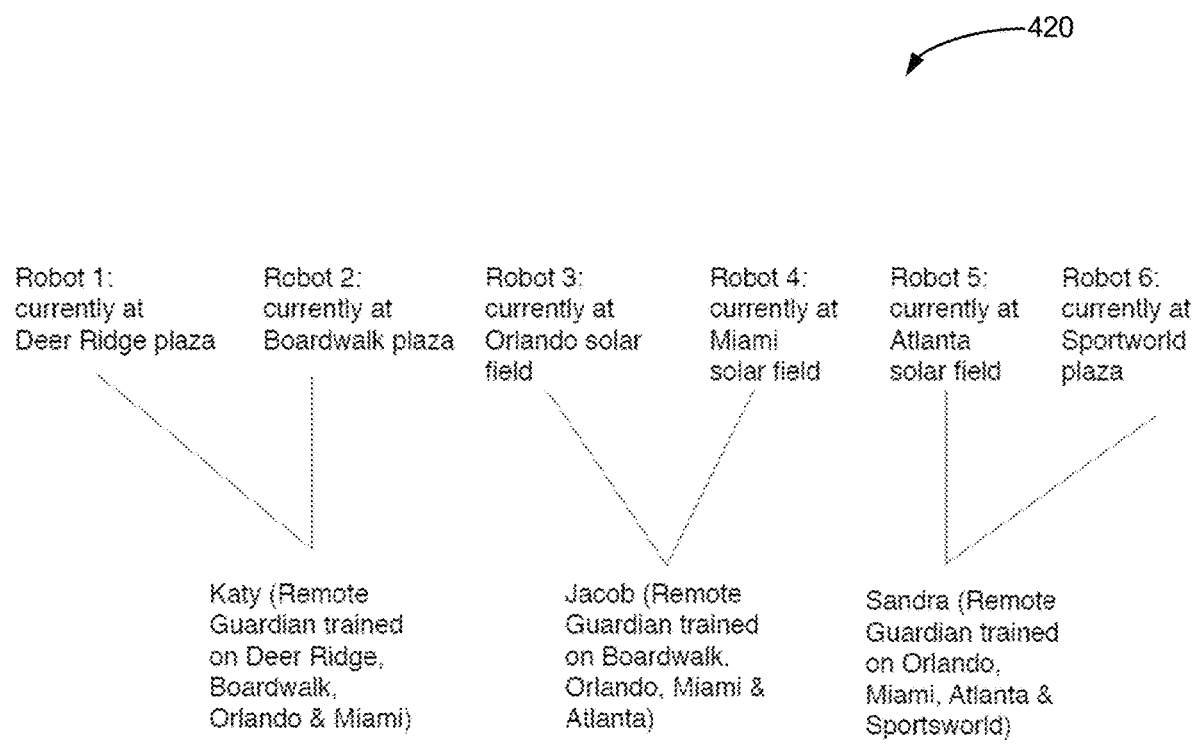
Figure 4C:
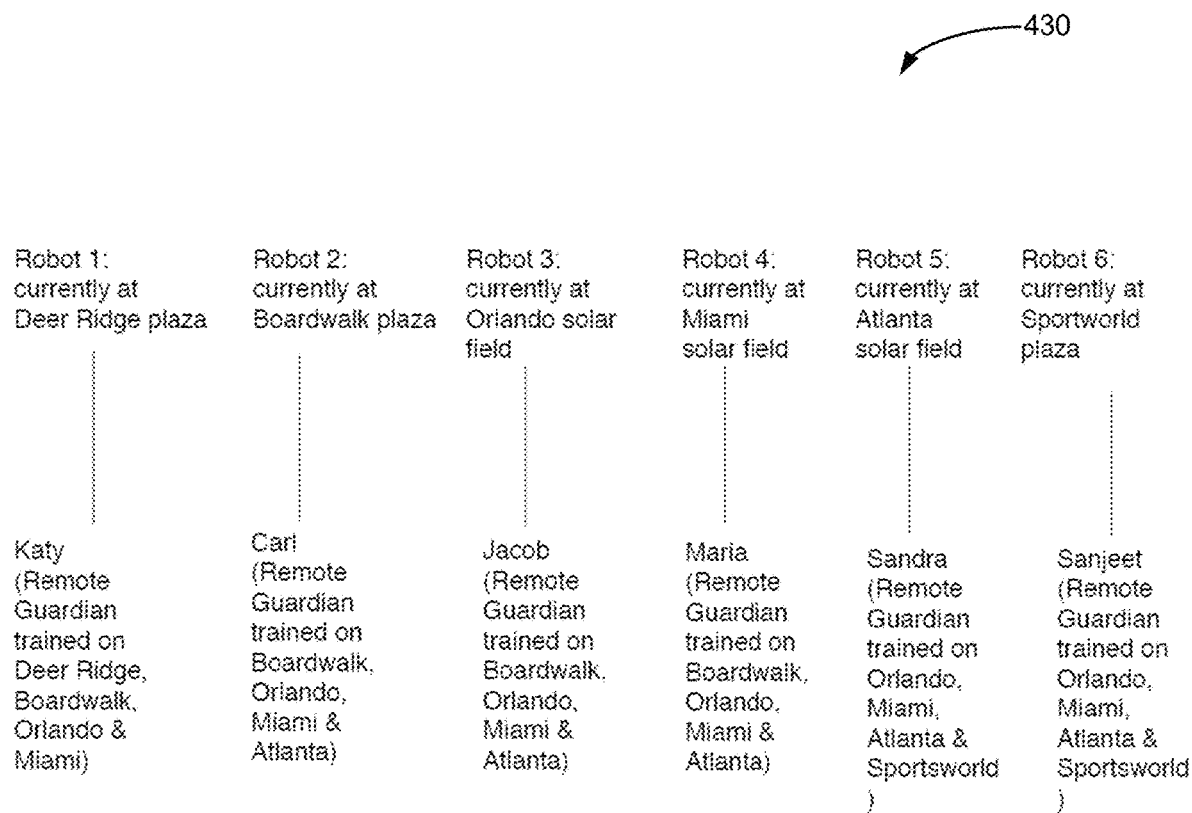

FIG. 4A, FIG. 4B and FIG. 4C illustrate dynamic assignments for remote robotic oversight based on dynamic risk scores for a low risk scenario, medium risk scenario, and high risk scenario, respectively, in accordance with one or more embodiments. In the low risk dynamic assignment 410 in FIG. 4A, each remote guardian is assigned 3 robots to oversee, based on the dynamic risk scores for the robots being low enough for such a ratio. In the medium risk dynamic assignment 412 in FIG. 4B, each remote guardian is assigned 2 robots to oversee, based on the dynamic risk scores for the robots being of a sufficient level to warrant a lower ratio. In the high risk dynamic assignment 414 in FIG. 4C, each remote guardian is assigned only 1 robots to oversee, based on the dynamic risk scores for the robots being high and dictating a need for a 1:1 ratio.

In an example embodiment, as shown in FIG. 4a, FIG. 4B and FIG. 4C, the routing choice of which video feeds a remote guardian will receive for their 1, 2, 3, 4 or "x" robots may give preference to properties that the remote guardian is trained on already. In an example embodiment, the system is configured to dynamically adjust the number of robots that a remote guardian watches over, based on dynamically changing risk scores and risk factors, while still having as many of those robots being watched by people familiar with the properties.

Figure 5:
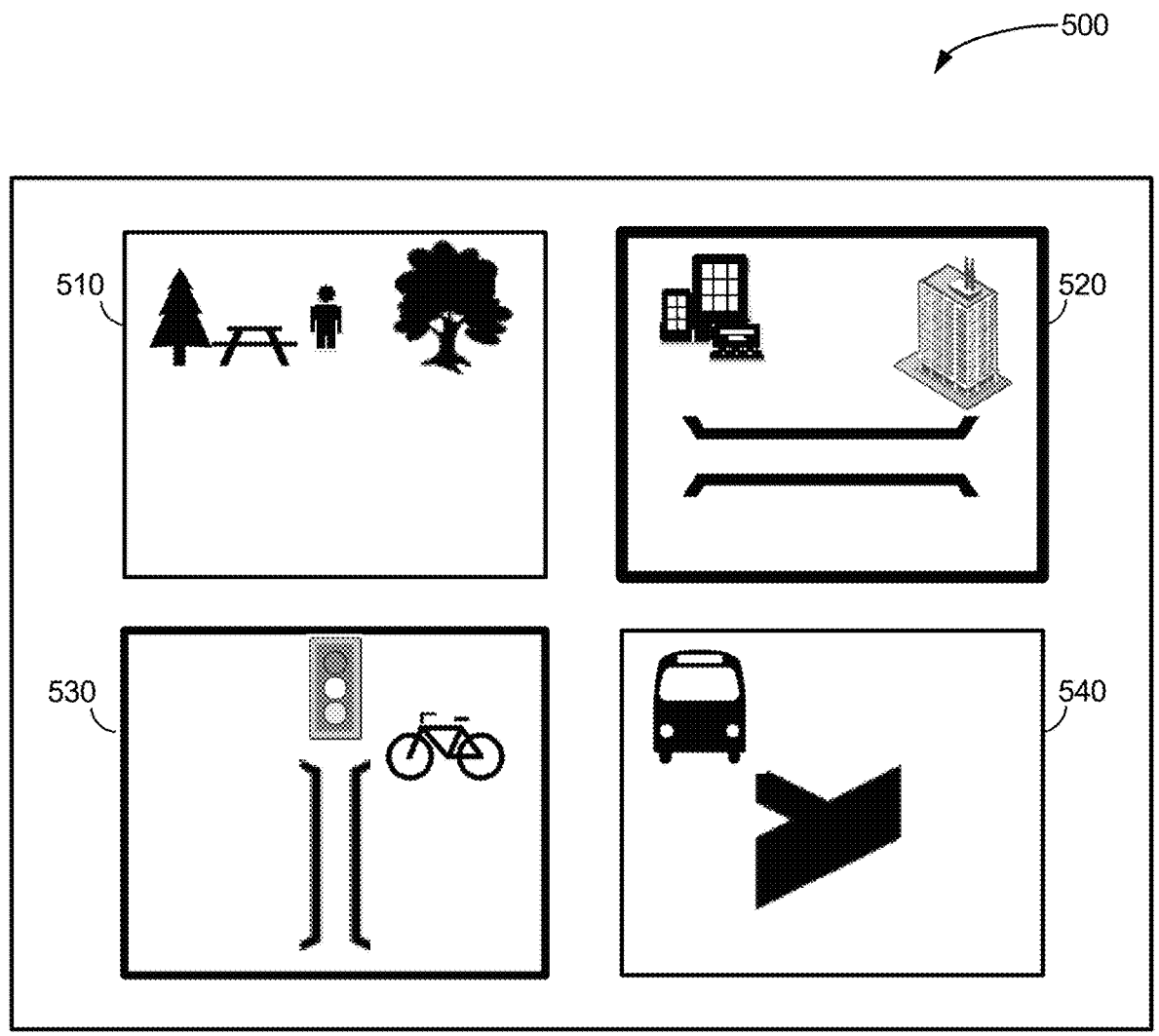
FIG. 5 illustrates an example output including a set of visual representations associated with to the set of robots assigned to an operator for remote oversight.

FIG. 5 illustrates an example output including a set of visual representations associated with to the set of robots assigned to an operator for remote oversight. The example output of FIG. 5 includes a still image of a first video feed 510 that indicates a few obstacles including trees and a person that are in the field of view, but may be determined to be far enough away not to warrant an increase in the dynamic risk score. A still image of a second video feed 520 indicates a roadway and some buildings, which are again in the field of view, and may be close enough to warrant an increase in the dynamic risk score, for example if the robot needs to cross the street. The increase in the dynamic risk score may be conveyed by providing a notification, for example by changing the colour or thickness of the frame surrounding the second video feed 520.

A still image of a third video feed 530 indicates that a traffic light is approaching, and also that a bicycle may be crossing the intersection. These objects may be close enough to warrant an increase in the dynamic risk score, for example if the robot needs to cross the street. The increase in the dynamic risk score may be conveyed by providing a notification, for example by changing the colour or thickness of the frame surrounding the second video feed 530. A still image of a fourth video feed 540 indicates a few obstacles including a bus and a roadway that are in the field of view, but may be determined to be far enough away not to warrant an increase in the dynamic risk score.

In another embodiment, the present disclosure provides a processor-implemented method for generating a display interface for managing remote oversight of a plurality of robots. The method may include obtaining an identification of a set of robots assigned to an operator for remote oversight, the set of robots being a subset of the plurality of robots. The method may include obtaining a dynamic risk score for each robot in the set of robots, the dynamic risk score associated with operational risk of proper robot operation. The method may include displaying a set of visual representations associated with the set of robots assigned to the operator for remote oversight.

In a further embodiment, the present disclosure provides a processor-implemented method for risk-based dynamic management of remote oversight of a plurality of robots. The method may include obtaining data associated with one or more risk factors associated with operational risk of proper robot operation. The method may include determining a dynamic risk score for each of the plurality of robots based on the one or more risk factors. The method may include assigning, based on the dynamic risk score for each of the plurality of robots, a set of robots to an operator for remote oversight. The method may include providing, to a display associated with the operator, a set of visual representations associated with the set of robots assigned to the operator for remote oversight.

In a further embodiment, the present disclosure provides a non-transient computer-readable storage medium having instructions embodied thereon, the instructions being executable by one or more processors to perform a computer-implemented method for controlling a robot as both generally and specifically described and illustrated herein.

In a yet further embodiment, the present disclosure provides a computing platform configured for controlling a robot. The computing platform may include a non-transient computer-readable storage medium having instructions embodied thereon. The computing platform may include one or more processors configured to execute the instructions to perform a computer-implemented method for controlling a robot as both generally and specifically described and illustrated herein.

In an example embodiment, the present disclosure provides a system of "kick-in" and "kick-out" from autonomous mode to tele-operation mode. The system may includes the ability for a remote guardian to watch a certain number of screens (for safety considerations) with the number of screens watched based on risk factors. For example, fewer screens are watched if in high traffic areas, or close to the road, or in areas where vehicles are regularly pulling into & out of driveways, or if at a time-of-day where any of the above happen more frequently. The system may include communication to the remote guardian of screens with items of interest through yellow or red outlines on the perimeter of the screen, for example as shown in FIG. 5, for example if a person is nearby or approaching on a bike or a vehicle is backing up out of a driveway nearby.

In an example embodiment, the system is configured to enable kick-outs when indicators are visually seen, for example a certain amount of green or brown pixels near the snow plow blade that would suggest the blade is ripping up grass or flowerbeds. The system may be configured to include kick-outs or "verifications" on orientation and positioning, for example if one or two or three 90-degree turns have been performed and the robot may not still be on-course.

In an example embodiment, the system is configured to measure a "risk score" based on a number of factors, for example: how many humans are around, how many humans are within 30/20/10 feet, how many bikers historically drive through the area, how many cars are around, time-of-day. The system is configured to determine which robots need a "1-to-1" robot-to-guardian relationship, a 2-to-1 relationship, 3-to-1 relationship, . . . , x-to-1 relationship.

In an example embodiment, the system defines and manages how much video and pictures, and quality of video and pictures, are stored long-term based on these risk profile measures, and optionally based on historical slip-and-fall claims based on geographic location.

In an example embodiment, the system may measure a risk score based on real-time or near-real-time feedback from remote guardians on how alert they feel, occasional reaction-speed tests happening from remote guardian portal, how high their "fake situations" score is for the day and over time, for far into a shift they are (e.g. 2 hours into a shift versus 7 hours into a shift). and other factors that reasonably would affect performance, e.g. measures of alertness as measured by facial expressions, body language, etc.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a compact disk read only memory (CD-ROM), digital versatile disk (DVD), Blu-ray Disc Read Only Memory (BD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A processor-implemented method for managing remote oversight of a plurality of robots, each of the plurality of robots further comprising a processor, a controller and a sensor and configured to operate with a sensor system, the method comprising:
    obtaining a dynamic risk score for each of the plurality of robots, the dynamic risk score associated with operational risk of robot operation;
    assigning, based on the dynamic risk score for each of the plurality of robots, a set of robots to an operator for remote oversight; and
    providing, to a display associated with the operator, a set of visual representations associated with the set of robots assigned to the operator for remote oversight;
    wherein the dynamic risk score is based on a risk factor and assigning the set of robots to the operator is based on the risk factor;
    wherein the risk factor includes identifying the number of people near the robot during operation;
    wherein the method is configured for dynamic management of the plurality of robots, the method is further configured for:
        assigning 1 to many remote oversight of the robots for a lower risk score; and
        assigning 1 to 1 remote oversight of the robots with a higher risk score.

2. The method of claim 1, wherein the risk factor comprises a robot risk factor selected from the group consisting of:
    proximity of people per hour of operation; proximity to roads; time of day;
    speed of movement; detected obstacles;
    detected unknown objects;
    detected high risk objects;
    visibility rating;
    lighting conditions; and
    latency of connection between robot and operator.

3. The method of claim 1, wherein the risk factor comprises an operator risk factor selected from the group consisting of:
    quality of video feed received by operator;

measured reaction time of operator; alertness indicator;
length of time on current shift; and
speed test results.

4. The method of claim 1, further comprising:
determining, the dynamic risk score for each of the plurality of robots based on one or more risk factors; and
storing, in a memory associated with the processor, the determined dynamic risk score for each of the plurality of robots.

5. The method of claim 4, wherein the risk factor comprises a robot risk factor selected from the group consisting of:
proximity of people per hour of operation; proximity to roads;
time of day;
speed of movement;
detected obstacles;
detected unknown objects;
detected high risk objects;
visibility rating;
lighting conditions; and
latency of connection between robot and operator.

6. The method of claim 4, wherein the risk factor comprises an operator risk factor selected from the group consisting of:
quality of video feed received by operator;
measured reaction time of operator;
alertness indicator;
length of time on current shift; and
speed test results.

7. The method of claim 1, wherein assigning the set of robots to the operator for remote oversight is based on the dynamic risk score for each of the plurality of robots as well as on a received operator performance indicator.

8. The method of claim 1, wherein providing the set of visual representations associated with the set of robots comprises:
providing a set of video feeds, the set of video feeds comprising a separate video feed associated with each robot in the set of robots, the number of video feeds being based on the dynamic risk score for each of the plurality of robots.

9. The method of claim 1, wherein providing the set of visual representations associated with the set of robots comprises providing a set of video streams, the set of video streams comprising a separate video stream associated with each robot in the set of robots.

10. The method of claim 1, wherein obtaining the dynamic risk score for each of the plurality of robots is based on real-time operational risk of proper robot operation.

11. A non-transient computer-readable storage medium having instructions embodied thereon, the instructions being executable by one or more processors to perform a computer-implemented method for controlling a plurality of robots, each of the plurality of robots comprising a processor, a controller and a sensor and configured to operate with a sensor system, the computer-implemented method further comprising:
obtaining a dynamic risk score for each of the plurality of robots, the dynamic risk score associated with operational risk of robot operation;
assigning, based on the dynamic risk score for each of the plurality of robots, a set of robots to an operator for remote oversight; and
providing, to a display associated with the operator, a set of visual representations associated with the set of robots assigned to the operator for remote oversight;
wherein the dynamic risk score is based on a risk factor and assigning the set of robots to the operator is based on the risk factor;
wherein the risk factor includes identifying the number of people near the robot during operation;
wherein the storage medium is configured for dynamic management of the plurality of robots, the method is further configured for:
assigning 1 to many remote oversight of the robots for a lower risk score; and
assigning 1 to 1 remote oversight of the robots with a higher risk score.

12. A computing platform configured for controlling a plurality of robots, each of the plurality of robots comprising a processor, a controller and a sensor and configured to operate with a sensor system, the computing platform further comprising:
a non-transient computer-readable storage medium having instructions embodied thereon; and
one or more processors configured to execute the instructions to perform a computer-implemented method for controlling the plurality of robots comprising:
obtaining a dynamic risk score for each of the plurality of robots, the dynamic risk score associated with operational risk of robot operation;
assigning, based on the dynamic risk score for each of the plurality of robots, a set of robots to an operator for remote oversight;
providing, to a display associated with the operator, a set of visual representations associated with the set of robots assigned to the operator for remote oversight;
wherein the dynamic risk score is based on a risk factor and assigning the set of robots to the operator is based on the risk factor;
wherein the risk factor includes identifying the number of people near the robot during operation;
wherein the computing platform is configured for dynamic management of the plurality of robots, the method is further configured for:
assigning 1 to many remote oversight of the robots for a lower risk score; and
assigning 1 to 1 remote oversight of the robots with a higher risk score.

* * * * *